Jan. 16, 1951  F. RADA  2,538,705
FURROW GUIDE TYPE WEEDER
Filed Aug. 23, 1946  2 Sheets-Sheet 2
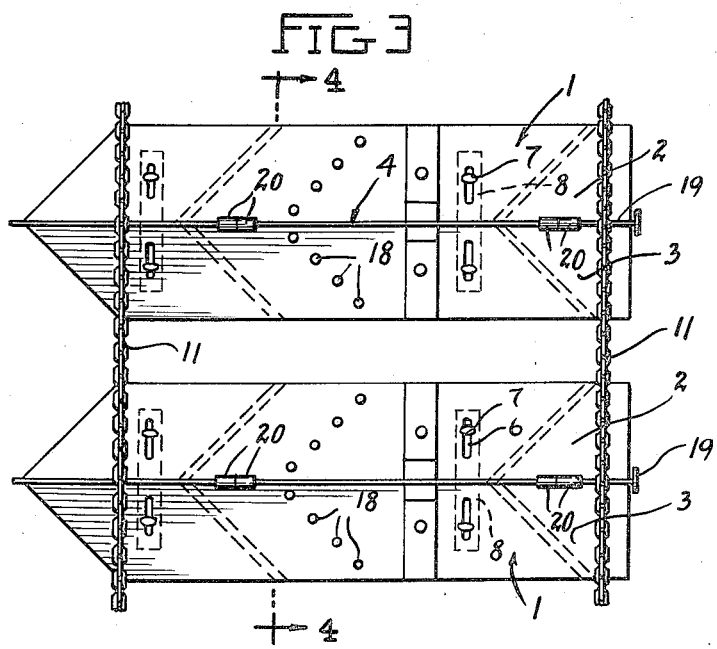
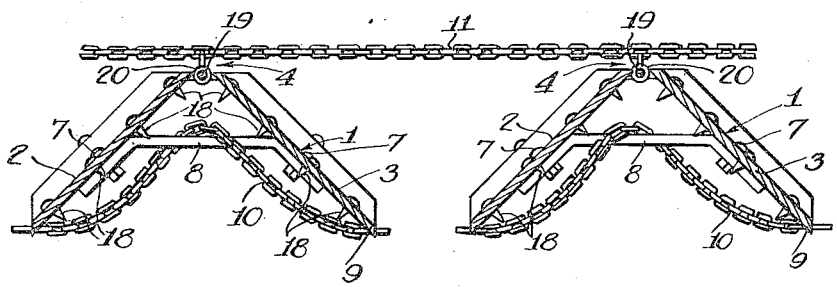
Inventor
*Frank Rada*
By *Clarence A. O'Brien
and Harvey B. Jackson*
Attorneys Patented Jan. 16, 1951

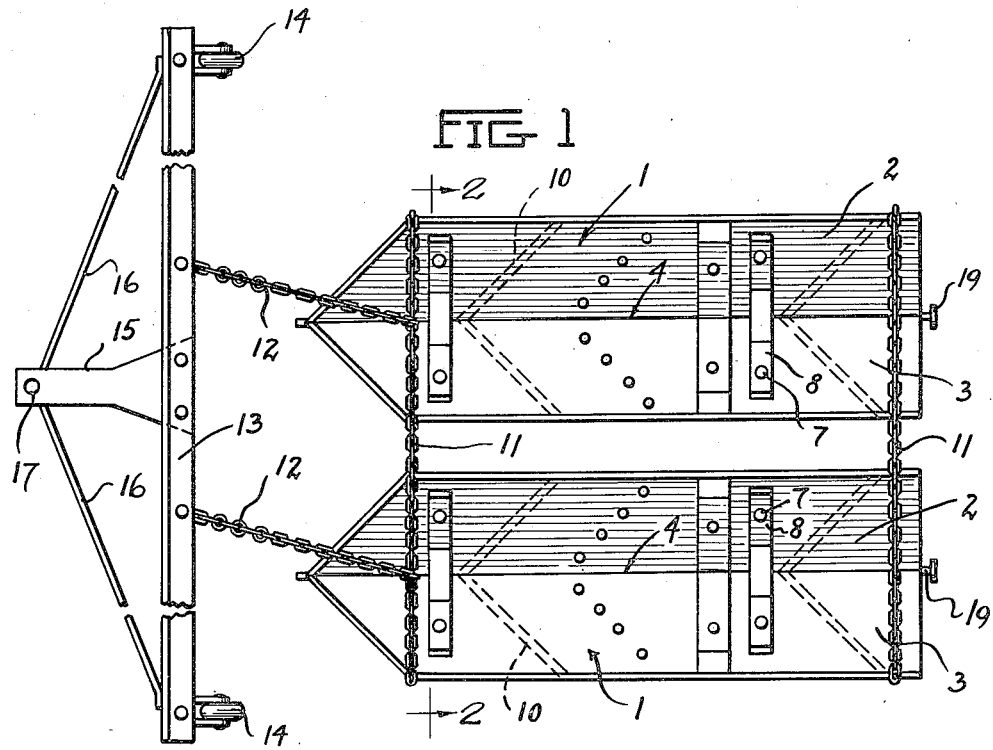
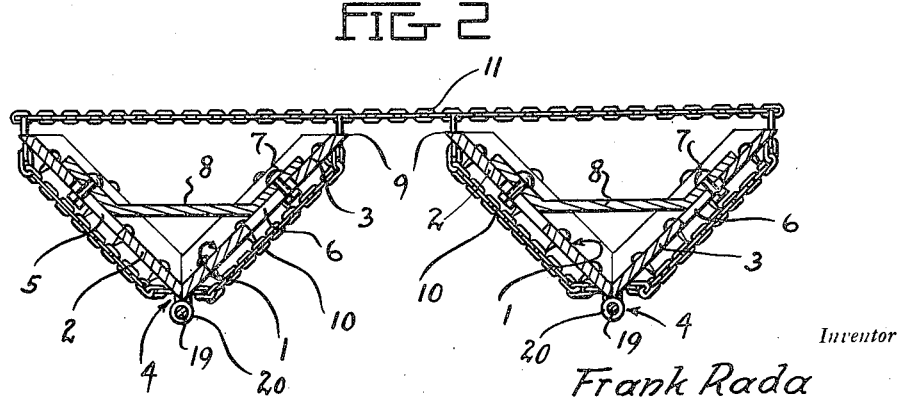

2,538,705

UNITED STATES PATENT OFFICE 2,538,705

FURROW GUIDE TYPE WEEDER

Frank Rada, Big Sandy, Mont.

Application August 23, 1946, Serial No. 692,448

5 Claims. (Cl. 97—143)

This invention relates to improvements in furrow drill weeders.

An object of the invention is to provide an improved furrow drill weeder including a plurality of V-shaped drag shoes, each of which is formed by a pair of plates hinged together and adapted to be drawn along in furrows with the bottom of the V down in the furrow, or in reversed position with the bottom of the V uppermost.

Another object of the invention is to provide an improved furrow drill weeder for weeding between wheat rows, the same including a plurality of V-shaped drag shoes tied together transversely with chains and secured at their forward ends to an evener bar, which in turn will be pulled either by a truck or tractor.

A further object of the invention is to provide an improved furrow drill weeder for weeding between wheat rows, the same including a plurality of inverted drag shoes formed by hinging a pair of plates together, and being provided with soil or dirt breaking spikes held in rigid position by means of adjustable cross braces.

Another object of the invention is to provide an improved furrow drill weeder comprising a plurality of inverted V-shaped drag shoes comprising hinged sections held together by adjustable cross braces and supporting cross ground engaging drag chains, said drag shoes being connected by chains to a wheeled evener bar, which in turn will be pulled by a truck or tractor.

Another object of the invention is to provide an improved furrow drill weeder which will be highly efficient in operation, and relatively inexpensive to manufacture and produce.

Other objects will appear as the description proceeds.

In the accompanying drawings which form a part of this application,

Figure 1 is a plan view of the improved furrow drill weeder showing two drag shoes attached to a wheeled evener bar;

Figure 2 is a partial sectional view taken on the line 2—2 of Figure 1;

Figure 3 is a plan view of the drag shoes disposed in upside down position with dirt breaking spikes in position thereon, and Figure 4 is a partial sectional view taken on the line 4—4 of Figure 3.

Like characters of reference are used throughout the following specification and the accompanying drawings to designate corresponding parts.

In carrying out the invention, there is provided an improved furrow drilled weeder comprising a plurality of drag shoes generally designated by the reference numeral 1.

Each drag shoe comprises a pair of cooperating elongated plates 2 and 3, which are hinged together at 4 at their adjacent edges to form a V-shaped shoe, and are formed with the oppositely disposed slots 5 and 6 through which the locking bolts 7 extend to also extend through the U-shaped crossed reinforcing ties or bars 8 to hold the hinged plates 2 and 3 in the desired angular adjustment and in the aforementioned V-shape.

The drag chains 10 will be secured to the outer surfaces of the plates 2 and 3, which will be connected to a cross chain 11 at their forward ends, and they in turn will be connected by the forwardly extending drag chains 12 with the evener bar 13 which is provided with the guide wheels 14 at its opposite ends. A tongue 15 will be connected with the central portion of the evener bar 13 and will be braced by the brace rods 16 connected therewith and with the opposite ends of said evener bar 13.

It is intended that the tongue 15 be connected with a truck or tractor (not shown) for pulling the furrow drill weeder, the same being attached in any desired manner with the apertures 17 formed in the forward end of said tongue.

In Figures 1 and 2 the drag shoes are shown with the hinges lowermost to be dragged in the furrows of either side of the wheat rows. However, in Figures 3 and 4, the drag shoes are shown in inverted position with the dirt breaking spikes 18 extending through the plates 2 and 3 to cultivate and loosen the dirt or soil at the opposite sides of the wheat rows. Similar cross chains 11 will be connected at the opposite ends of the drag shoes and may be attached to the evener bar in a similar manner as the drag bars when in the position shown in Figures 1 and 2.

Removable hinge pins 19 will extend lengthwise through apertures in the hinge plate members 20.

From the foregoing description, it will be apparent that there has been provided a highly efficient form of furrow drill weeder which may be pulled along the furrows between wheat rows either with the V-shaped drag shoes in upright or in upside down positions.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A drag shoe for a furrow drill weeder comprising a pair of side plates having a hinge connection at a pair of adjacent edges of the plates, whereby the plates are disposable selectively in two positions, in V-shape in a furrow and in inverted V-shape straddling a row, a U-shaped bracing bar adjustable connected between said side plates in each of said positions, and soil pulverizing means carried by said side plates.

2. A drag shoe for a furrow drill weeder comprising a pair of side plates having a hinge connection at a pair of adjacent edges of the plates, whereby the plates are disposable selectively in two positions, in V-shape in a furrow and in inverted V-shape straddling a row, a U-shaped bracing bar adjustably connected between said side plates in each of said positions, and drag chains secured to and between the end portions of said plates remote from said hinge connection.

3. A drag shoe for a furrow drill weeder comprising a pair of side plates having a hinge connection at a pair of adjacent edges of the plates, whereby the plates are disposable selectively in two positions, in V-shape in a furrow and in inverted V-shape straddling a row, means for securing the side plates in each of said positions, and soil pulverizing means carried by each of said plates.

4. A drag shoe for a furrow drill weeder comprising a pair of side plates having a hinge connection at a pair of adjacent edges of the plates, whereby the plates are disposable selectively in two positions, in V-shape in a furrow and in inverted V-shape straddling a row, means for securing the side plates in each of said positions, and soil pulverizing means carried by each of said plates, said soil pulverizing means comprising drag chains secured to and between the end portions of the said plates remote from said hinge connection and spikes secured to and extending outwardly from one corresponding pair of surfaces of said plates.

5. A drag shoe for a furrow drill weeder comprising a pair of side plates having a hinge connection at a pair of adjacent edges of the plates, whereby the plates are disposable selectively in two positions, in V-shape in a furrow and in inverted V-shape straddling a row, brace means for securing the said plates in said two positions, and spikes secured to said plates and extending from one pair of corresponding surfaces of said plates and comprising soil pulverizing means.

FRANK RADA.

REFERENCES CITED

The following references are of record in the file of this patent:

UNITED STATES PATENTS

| Number | Name | Date |
|---|---|---|
| 339,452 | McCandless | Apr. 6, 1886 |
| 446,624 | Lyons | Feb. 17, 1891 |
| 817,999 | Stark | Apr. 17, 1906 |
| 1,105,198 | Holland | July 28, 1914 |
| 1,113,382 | Thomas | Oct. 13, 1914 |
| 1,158,803 | Gullickson | Nov. 2, 1915 |
| 1,245,431 | Boyd | Nov. 6, 1917 |
| 1,695,710 | Georgius | Dec. 18, 1928 |
| 2,304,671 | Bayless | Dec. 8, 1942 |

FOREIGN PATENTS

| Number | Country | Date |
|---|---|---|
| 13,233 | Hungary | Dec. 31, 1898 |

OTHER REFERENCES

Farm Implement and Machinery Review, Nov. 1, 1946, vol. 72, No. 859, pp. 642 and 646.